United States Patent
Bibby

(10) Patent No.: US 7,788,673 B2
(45) Date of Patent: Aug. 31, 2010

(54) METHOD AND SYSTEM FOR GENERATING A STATIC PARTITION SCHEDULING TIMELINE WITH REDUCED CONTEXT SWITCHING OVERHEAD

(75) Inventor: Dave Bibby, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 1346 days.

(21) Appl. No.: 11/224,339

(22) Filed: Sep. 12, 2005

(65) Prior Publication Data

US 2007/0061807 A1    Mar. 15, 2007

(51) Int. Cl.
G06F 9/46 (2006.01)
(52) U.S. Cl. .................... 718/107; 718/104
(58) Field of Classification Search .............. 718/107, 718/108, 104
See application file for complete search history.

(56) References Cited

U.S. PATENT DOCUMENTS 6,304,891 B1 * 10/2001 Anderson et al. .......... 718/107

OTHER PUBLICATIONS

K. Gupta, A. Bestavros, and I. Matta; "Context-aware Real-time Scheduling"; IEEE Real-Time and Embedded Technology and Applications Symposium, Work in Progress Session A, May 25-May 28, 2004, Le Royal Meridien, King Edward, Toronto, Canada.*

D. Kim and Y. Lee; "DC2 scheduling for aperiodic tasks in strongly partitioned real-time systems"; Real-Time Computing Systems and Applications, 2000. Proceedings. Seventh International Conference on Dec. 12-14, 2000 pp. 368-375.*
Y. Lee, D. Kim, M. Younis, and J. Zhou; "Partition Scheduling in APEX Runtime Environment for Embedded Avionics Software"; Real-Time Computing Systems and Applications, 1998. Proceedings. Fifth International Conference on Oct. 27-29, 1998 pp. 103-109.*
C.L. Liu and James W. Wayland, Scheduling Algorithms for Multiprogramming in a Hard-Real-Time Environment, Journal of the Association for Computing Machinery, Jan. 1973, pp. 46-61, vol. 20, No. 1, Published in: US.

* cited by examiner

Primary Examiner—Meng-Ai An
Assistant Examiner—Nikhil Krishnan
(74) Attorney, Agent, or Firm—Fogg & Powers LLC

(57) ABSTRACT

A static partition scheduling timeline is generated by identifying a plurality of partitions for scheduling, the partitions associated with a operating system that executes on a processing unit. A first plurality of Activation Frames for a first partition of said plurality of partitions is defined, a second plurality of Activation Frames for a second partition of said plurality of partitions is defined, a first plurality of slices within at least one Activation Frame of said first plurality of Activation Frames is defined, and a second plurality of slices within at least one Activation Frame of said second plurality of Activation Frames is defined. The static partition scheduling timeline comprises the first plurality of Activation Frames, the second plurality of Activation Frames, the first plurality of slices, and the second plurality of slices. The operating system is configured to use the generated static partition scheduling timeline.

15 Claims, 4 Drawing Sheets

METHOD AND SYSTEM FOR GENERATING A STATIC PARTITION SCHEDULING TIMELINE WITH REDUCED CONTEXT SWITCHING OVERHEAD

FIELD OF THE INVENTION

The present invention relates generally to the computer processing field, and more specifically, but not exclusively, to a method and system for generating a static partition scheduling timeline with minimized context switching overhead.

BACKGROUND OF THE INVENTION

In modern avionics systems, partitioning operating systems are being used to meet stringent safety- and mission-critical requirements especially where predictability is of concern. Specifically, partitioning operating systems used in avionics systems are designed to separate safety related functions from other functions, so that an action in a non-safety related function will not cause a failure of a safety related function. Generally, in a typical partitioning operating system, memory is divided into a plurality of statically allocated partitions. Each partition is permanently limited to its initial fixed memory and time allocation. Thus, a partitioning operating system enables a single processor to function as if it is multiple processors, by isolating the subsystems or processes within the different partitions involved.

Aeronautical Radio Inc. (ARINC) is an international aviation industry organization that sponsors industry committees and participates in related industry activities that contribute to flight safety and efficiency. The Airlines Electronic Engineering Committee (AEEC) is an international standards organization (sponsored by ARINC) composed of major airline operators and other airspace users, which establishes consensus-based, voluntary functional and interface standards published by ARINC (known as ARINC Standards). ARINC Standards provide specifications for avionics equipment and systems used by thousands of commercial aircraft worldwide.

ARINC-653 is a general purpose specification for a hardware-partitioned Application/Executive (APEX) interface for avionics computers' operating systems and application software. ARINC-653 was defined to create an aviation industry standard for a time and space partitioning operating system. The specification includes interface requirements and a list of services that enable the application software to control the scheduling, communication and status information of its internal processing elements. Notably, ARINC-653 provides an APEX interface for avionics systems that may be used wherever multiple applications are required to share a single processor and memory, and also provides a guarantee that a failure of one application will not cause another application to fail. Thus, each partition in an ARINC-653 system represents a separate application and utilizes the memory space allocated to it (e.g., space partitioning). Also, the APEX interface allots a dedicated time slice to each partition (e.g., time partitioning).

Notwithstanding the numerous advantages of ARINC-653, a significant problem arises in attempting to meet the basic requirements of the specification. Specifically, each ARINC-653 operating system is capable of hosting multiple partitions on a shared processing resource within a safety-critical avionics environment. In that regard, the specification requires that each partition be isolated from the others, by dedicating a static allocation of memory space and execution time to each partition. The system integrator specifies this static allocation of memory space and execution time for each partition when the system is initially configured. Thus, ARINC-653 requires that a scheduling timeline be statically generated that allocates processor time to each hosted partition. In generating this timeline, the technique used has to support multiple partitions with various frame times, and also minimize the number of context switches between partitions. However, the problem in attempting to meet these requirements of ARINC-653 is that the specification provides no algorithm or guidance for generating the static allocation scheduling timeline. Therefore, it would be advantageous to provide a method and system for generating a static allocation scheduling timeline for a plurality of partitions that meets, among other things, the above-described requirements of the ARINC-653 specification, and also minimizes the number of context switches between partitions. As described in detail below, the present invention provides such a method and system, which resolves the above-described problem and other similar problems.

SUMMARY OF THE INVENTION

The present invention provides a method and system for generating a static partition scheduling timeline, which minimizes context switching overhead. In accordance with a preferred embodiment of the present invention, a method is provided for generating a static partition scheduling timeline, which models each partition as a period and duration, and allocates each partition its requested duration of execution time (not necessarily continuous) in each period. More precisely, a method for generating a static partition scheduling timeline is provided that divides the CPU execution time into a repeating sequence of activation frames. An activation frame is defined as a continuous period of time during which no partition period starts or ends. An "earliest deadline, first prioritization" technique can be used for allocating partition execution time slices to each of the activation frames, in order to create an initial timeline. Then, partitions that have slices in adjacent activation frames within the same partition period are moved to the start and end of the adjacent activation frames and merged at the frame boundary. Specifically, for this example embodiment, a list of partitions and their respective attributes (e.g., period and duration) are provided as inputs for the method, and a static partition scheduling timeline is generated as a list of slices that repeats at the least common multiple of all of the partition periods. Each such slice is defined by a slice start time, slice duration, and the partition that the slice is allocated to. The generated scheduling timeline also includes one or more idle slices (e.g., time not allocated to a partition) so that the sum of the slice durations is equal to the period at which the timeline repeats.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
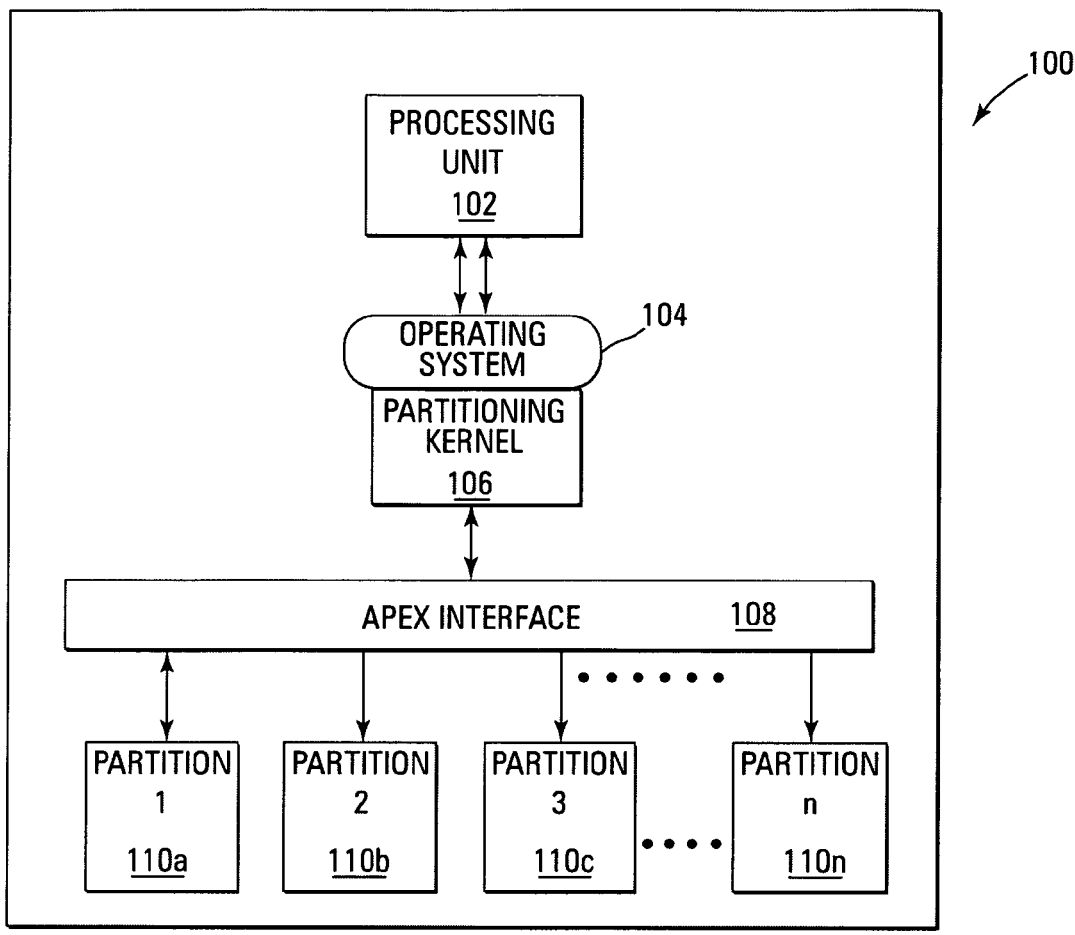
FIG. 1 depicts a block diagram of an example system that can be used to generate a static partition scheduling timeline, in accordance with a preferred embodiment of the present invention.

With reference now to the figures, FIG. 1 depicts a block diagram of an example system 100 that can be used to generate a static partition scheduling timeline, in accordance with a preferred embodiment of the present invention. For this example embodiment, system 100 includes a processing unit 102 (e.g., suitable microcontroller, microprocessor, embedded processor, computer processor, CPU, etc.) that functions, among other things, to execute the instructions of an operating system 104. For example, processing unit 102 can be arranged as a single processor connected to a data communications bus or system bus. A memory controller/cache can also be connected to the data communications bus or system bus, which can provide an interface between processing unit 102 and a local memory (e.g., RAM, ROM, etc.). Also, for this example embodiment, operating system 104 includes a plurality of machine instructions stored in the local memory, which can be retrieved and operated on by processing unit 102. An Input/Output (I/O) bus bridge can also be connected to the data communications bus or system bus, which can provide an interface between processing unit 102 and an I/O bus. Thus, processing unit 102 can receive, retrieve and/or send data via such an I/O bus. In any event, those of ordinary skill in the art will appreciate that the hardware described herein for processing unit 102 in FIG. 1 may vary. As such, the depicted example is provided for illustrative purposes and not meant to imply any architectural limitations with respect to the present invention.

For this example embodiment, operating system 104 includes a partitioning kernel 106, which (in this example) functions primarily to manage partitioning functions for operating system 104. As such, in conjunction with operating system 104 and partitioning kernel 106, an APEX interface 108 is also included that provides space and time partitioning via a plurality of formulated partitions 110a-110n (e.g., 110x, x in the range 1 to n, where "x" represents the "$x^{th}$" partition of a series of "n" partitions). Specifically, for this example embodiment, APEX interface 108 is a general purpose APEX interface for an avionics computer's operating system and application software that can satisfy the pertinent requirements of ARINC-653. In other words, as described in detail below, the present invention provides a scheduler algorithm for APEX interface 108, which generates a static partition scheduling timeline that meets the requirements of ARINC-653.

Generally, the present invention provides a technique for generating a static partition scheduling timeline, which models each partition as a period and duration, and allocates each partition its requested duration of execution time (not necessarily continuously) in each period. Specifically, one embodiment of the present invention generates a static partition scheduling timeline, which divides the execution time of a processing unit (e.g., 102) into a repeating sequence of activation frames. An activation frame is defined as a continuous period of time during which no partition period starts or ends. For this example embodiment, an earliest deadline, first prioritization technique is used for allocating partition execution time slices to each of the activation frames, in order to create an initial timeline. The slices can be allocated within an activation frame in any suitable order. Then, partitions that have slices in adjacent activation frames within the same partition period are moved to the start and end of their respective (adjacent) activation frames and merged at the frame boundary.

As such, for this example embodiment, a method for generating a static partition scheduling timeline is provided, whereby a list of partitions and their respective attributes (e.g., periods and durations) are provided as inputs, and a static partition scheduling timeline is generated and represented as a list of slices that repeats at the least common multiple of all of the partition periods involved. Each such slice is defined by a slice start time, slice duration, and the partition that the slice is allocated to. The generated static partition scheduling timeline can also include one or more idle slices (e.g., time not allocated to a partition) so that the sum of all of the slice durations is equal to the period at which the timeline repeats.

Specifically, in accordance with a preferred embodiment of the present invention, a partition model can be defined, whereby each partition (e.g., 110a-110n in FIG. 1) to be hosted on an ARINC-653 operating system (e.g., operating system 104) can be thought of as being a virtual Line-Replaceable Unit (LRU). In other words, each partition can function as if it is being hosted in a dedicated, federated LRU instead of being a part of an Integrated Electronic System. As such, the software environment in a typical federated LRU is a dedicated processor that provides a maximum of a defined level of processing throughput (e.g., Millions of Instructions per Second or MIPS). Typically, a federated LRU provides a "real-time interrupt" at a predetermined interval, which allows the software in the federated LRU to execute its own functions at a known "real-time" rate. The software in the federated LRU then executes individual functions at this interval (or a multiple of this interval). This software can also have functions without real-time requirements that execute asynchronously (e.g., independently of the "real-time interrupt").

Figure 2:
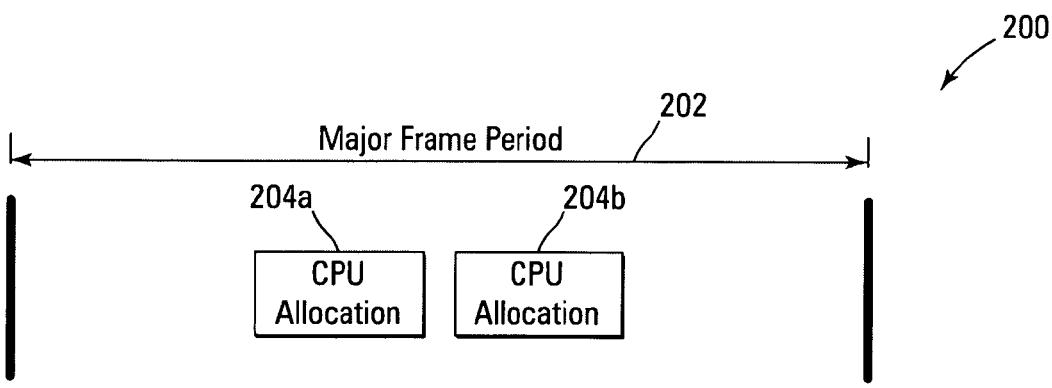
FIG. 2 depicts a pictorial representation of an example partition allocation model, which illustrates principles of the present invention.

Thus, for this example embodiment, a first step in scheduling a static partition timeline is to define (or model) each partition in terms of its respective execution needs. Similar to a federated LRU, each partition may be defined by an execution time duration that repeats at a predetermined period (e.g., "major frame period"). For example, such a "major frame period" may correspond to a real-time interrupt for a federated LRU, and the duration may be selected to provide the equivalent throughput that a dedicated processor would provide if it were sized for just the partition involved. In that regard, FIG. 2 depicts a pictorial representation of an example partition allocation model, which illustrates the above-described principles of the present invention. As shown in FIG. 2, a model partition 200 is defined by a major frame period 202, and with a duration selected to provide the equivalent throughput (e.g., 6 MIPS equivalent processor execution time) that a dedicated processor sized for that partition would provide (e.g., represented by the two CPU execution time allocations 204a and 204b).

Essentially, for this example, the process of generating a static partition scheduling timeline can be performed (e.g., by processing unit 102 and operating system 104 in FIG. 1) in three steps. First, a bare timeline can be created by defining a repeating sequence of Activation Frames. Second, slices can be allocated in each Activation Frame for partitions using a "Preemptive Earliest Deadline First" scheduling technique. Third, each pair of adjacent Activation Frames can be examined to identify any pair of slices (e.g., one slice in each of the adjacent Activation Frames) that can be merged into a single slice (e.g., to minimize context switching).

Figure 3:
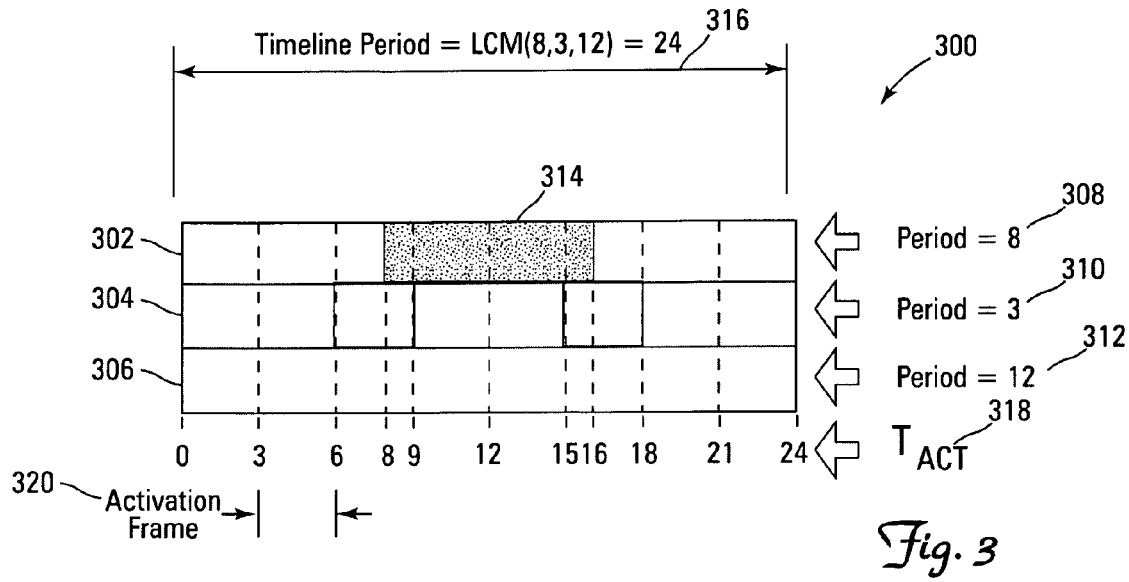
FIG. 3 depicts a diagram that illustrates how to identify and define Activation Frames in an example partitioned operating system, in accordance with a preferred embodiment of the present invention.

Specifically, for this example embodiment, the first step of identifying and defining Activation Frames is illustrated in the example partitioned operating system depicted in FIG. 3. Referring now to FIG. 3, a partitioned operating system 300 includes a plurality of partitions (e.g., three in this example) 302, 304 and 306. Each such partition has an associated time period to be scheduled. For example, partition 302 has a repeating period 308 equal to 8 units of time (e.g., 8 minus 0, 16 minus 8, 24 minus 16), partition 304 has a repeating period 310 equal to 3 units of time (e.g., 3 minus 0, 6 minus 3, . . . 24 minus 21), and partition 306 has a repeating period 312 equal to 12 units of time (e.g., 12 minus 0, 24 minus 12). For illustrative purposes, the period (e.g., 8 units of time) identified for partition 302 is accentuated by the shaded region 314. As such, the Timeline Period 316 (e.g., the period at which the entire timeline repeats) can be determined by finding the Least Common Multiple of all of the partitions (e.g., 302, 304, 306) that are to be scheduled. For this example embodiment, the Timeline Period 316 is the Least Common Multiple of the periods 8, 3 and 12, which is a time period equal to 24. Thus, for this example, the Timeline Period for all of the partitions 302, 304, 306 is equal to 24 units of time.

Next, for this example embodiment, the Activation Times for the partitions 302, 304, 306 can be determined as follows (e.g., by processing unit 102):

$T_{ACT}$=Period*$n$, for n=0 . . . k, where
Period*$k$=Timeline Period.

The values of all of the determined Activation Times ($T_{ACT}$) 318 are then sorted (e.g., by processing unit 102), any duplicates are removed, and a list of Activation Times is thus formed, wherein the first Activation Time value is equal to 0, and the last value is equal to the value of the Timeline Period 316. As such, each entry in this list defines the start and end of an Activation Frame (e.g., as exemplified by Activation Frame 320).

Figure 4A:
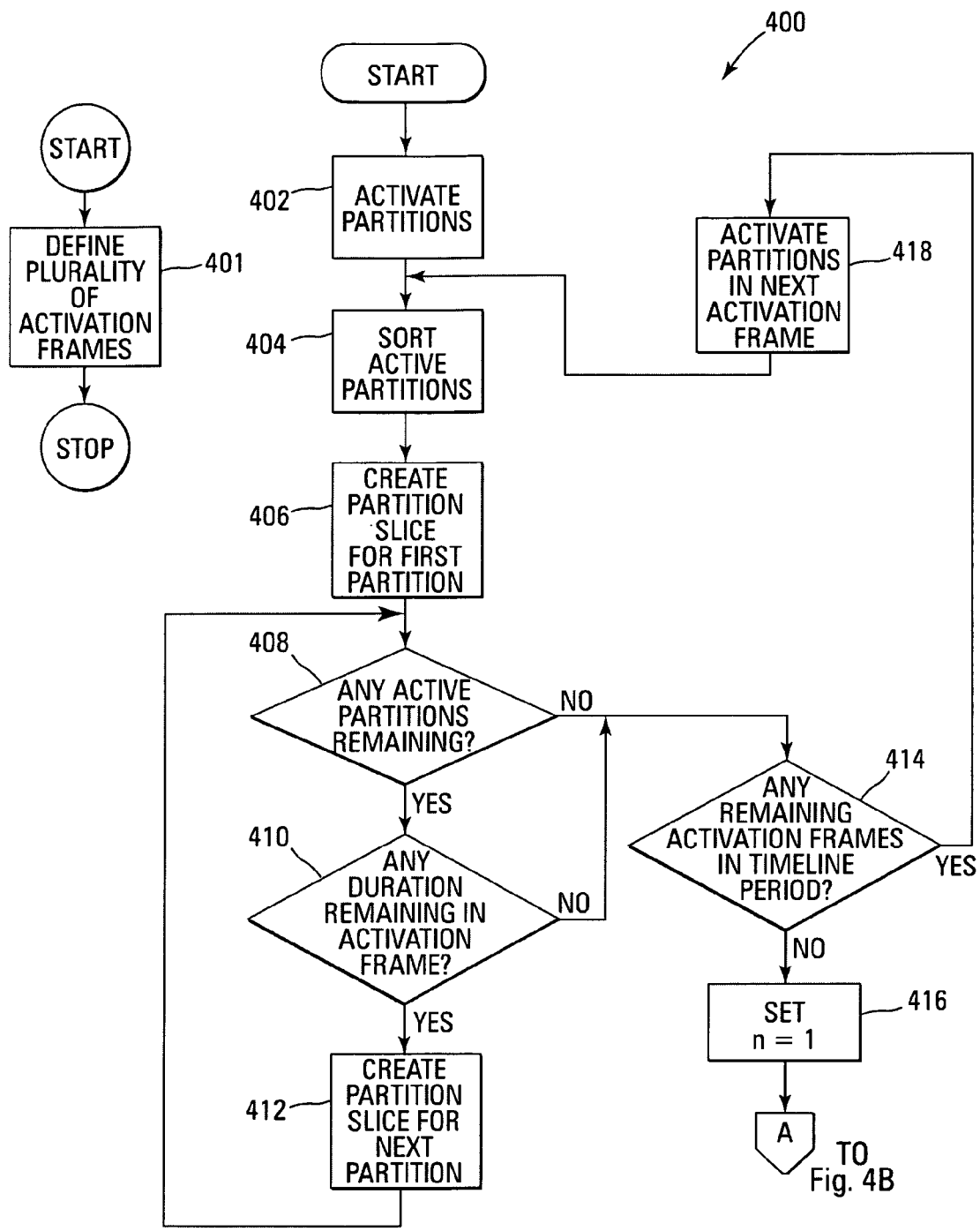
FIGS. 4A and 4B are related flowcharts depicting an example method for allocating partition slices and merging adjacent partition slices, in accordance with teachings of the present invention.
Figure 4B:
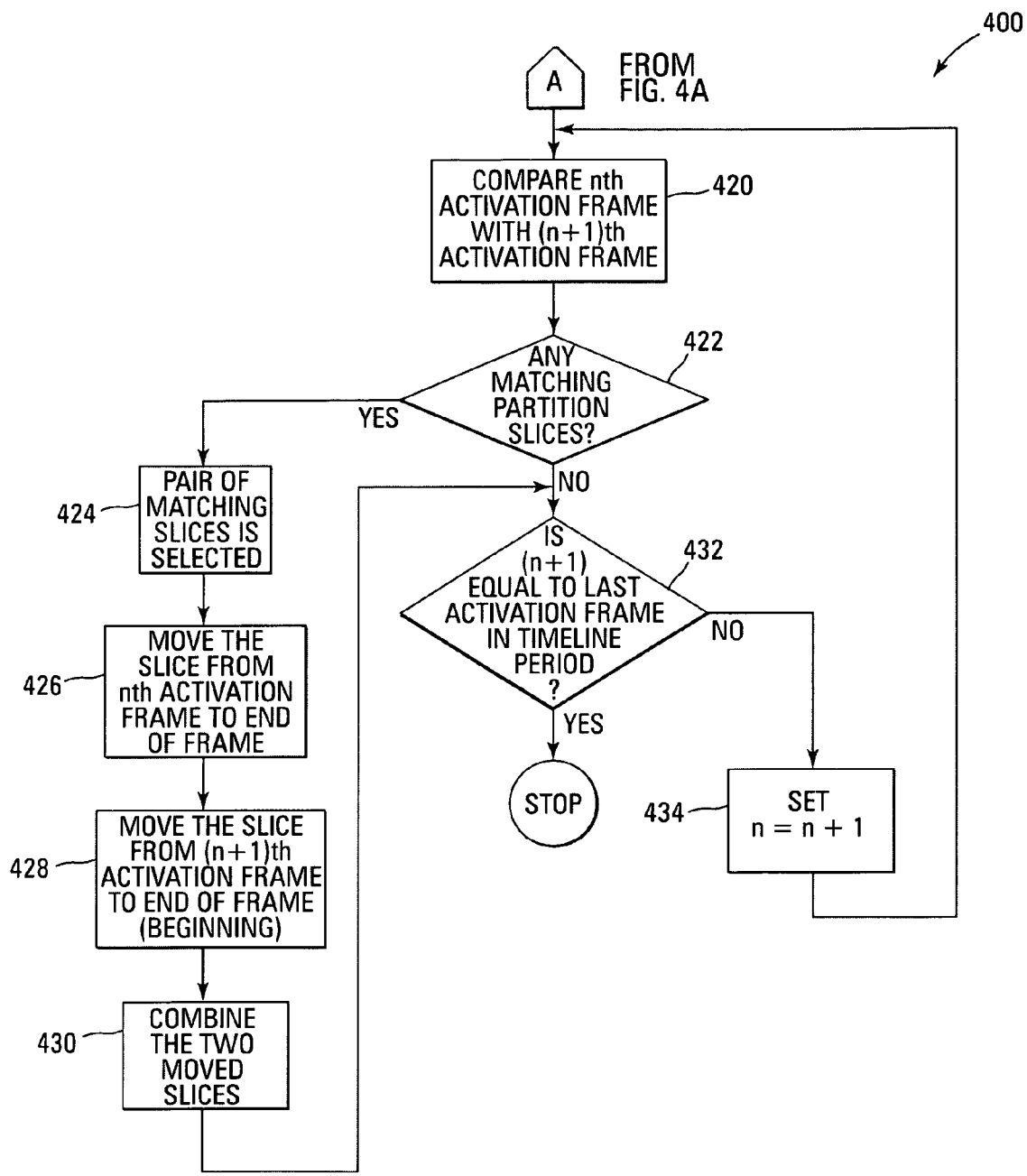

Once the Activation Frames have been identified, partition slices are then allocated for the Activation Frames involved, and eligible adjacent partition slices can be merged. For this example embodiment, an example method that can be used for allocating partition slices for Activation Frames and merging eligible adjacent partition slices is depicted in FIGS. 4A and 4B. As such, FIGS. 4A and 4B are related flowcharts depicting an example method 400 for allocating partition slices and merging adjacent partition slices, in accordance with teachings of the present invention. As shown, method 400 can be implemented as software instructions and executed, for example, by processing unit 102 in combination with operating system 104 in FIG. 1. Notably, method 400 allocates partition slices using a Preemptive Earliest Deadline First scheduling approach. However, it should be understood that the present invention is not intended to be so limited, and can include the use of any other suitable scheduling approach for allocating partition slices (e.g., Rate Monotonic scheduling, etc.). However, for this embodiment, a Preemptive Earliest Deadline First scheduling approach is preferred, because this approach is guaranteed to produce a feasible schedule for any set of partitions that satisfy the following relationship: $\Sigma C_n/T_n <= 1$, where $T_n$ is the period of partition n, and $C_n$ is the allocated duration each period for partition n.

Referring now to FIG. 4A for an example method 400 that can be used for allocating partition slices, first note (step 401) that an assumption is made that a plurality of Activation Frames has been defined in accordance with the description given above for FIG. 3. Method 400 continues by (e.g., using the above-described relationship for each Activation Frame, starting with t=0) activating all partitions whose period begins at the start of the Activation Frame (step 402). Next, all of the active partitions are sorted to form a list with the earliest "next partition activation point" first in the list, and the latest "next partition activation point" last in the list (step 404). Essentially, method 400 then creates a partition slice for the first partition, with a duration that is the smallest of the remaining duration of the current Activation Frame or the remaining duration in the partition's current period. This step is repeated until either no active partitions remain, or the remaining duration of the current Activation Frame is equal to zero.

Specifically, for this example embodiment, a determination is made (e.g., by processing unit 102) about whether or not any active partitions are remaining (step 408). If so, then a determination is made about whether any duration remains in the Activation Frame involved (step 410). If a suitable amount of duration remains in that Activation Frame, then a partition slice is created for the next partition (step 412). Returning to step 408, if there are no active partitions remaining (e.g., in this iterative loop), then flow proceeds to step 414. Also, returning to step 410, if no duration is remaining in the Activation Frame involved, then flow proceeds to step 414. In either case, at step 414, a determination is made about whether there are any Activation Frames remaining in the Timeline Period. If so, method 400 then activates the partitions in the next Activation Frame (step 418). Otherwise, if (at step 414) there are no Activation Frames remaining in the Timeline Period, then flow proceeds to step 416, which is an initialization step (e.g., set n=1) of an example approach that can be used for merging adjacent partition slices (as described in detail below with respect to FIG. 4B).

Essentially, for this example embodiment, in order to merge adjacent partition slices (and help minimize context switching between partitions), each pair of adjacent Activation Frames is examined to determine if two slices in these Activation Frames can be merged. As such, each slice in the first Activation Frame is examined to determine if there is a corresponding slice in the second Activation Frame that is allocated to the same partition, and also whether both Activation Frames span the same partition period. The two slices that meet these criteria are selected to be merged. The selected slices are merged into a single slice by moving the slice from the first Activation Frame to the end of that Activation Frame, and moving the slice from the second Activation Frame to the beginning of that Activation Frame, which combines these two slices to form a signal slice. Advantageously, in this manner, context switching between partitions is minimized.

Referring now to FIG. 4B for this example embodiment (and assuming that initialization step 416 in FIG. 4A has been performed), the nth Activation Frame (e.g., resulting from the steps in FIG. 4A) is compared with the (n+1)th (next) Activation Frame (step 420). Next, for each slice in the nth Activation Frame, a determination is made about whether there are "matching" partition slices (step 422). In other words, is there any slice in the (n+1)th or next Activation Frame that is allocated to the same partition as the first slice, and also do both of those Activation Frames span the same partition period? If so, this pair of slices can be selected for merging (step 424). Thus, the slice from the nth Activation Frame is moved to the back end of that Activation Frame (step 426), and the slice from the (n+1)th or next Activation Frame is moved to the front end or beginning of that Activation Frame (step 428). Next, these two (now adjacent) slices are combined to form a single slice (step 430). At this point, if the (n+1)th Activation Frame is the last Activation Frame in the Timeline Period (step 432), method 400 can be terminated, and a static partition timeline is thus generated as a list of slices. Otherwise (at step 432), if the (n+1)th Activation Frame is not the last Activation Frame in the Timeline Period, the method is continued and the value of n is indexed and increased by 1 (step 434). In this case, the flow then returns to step 420.

Figure 5A:
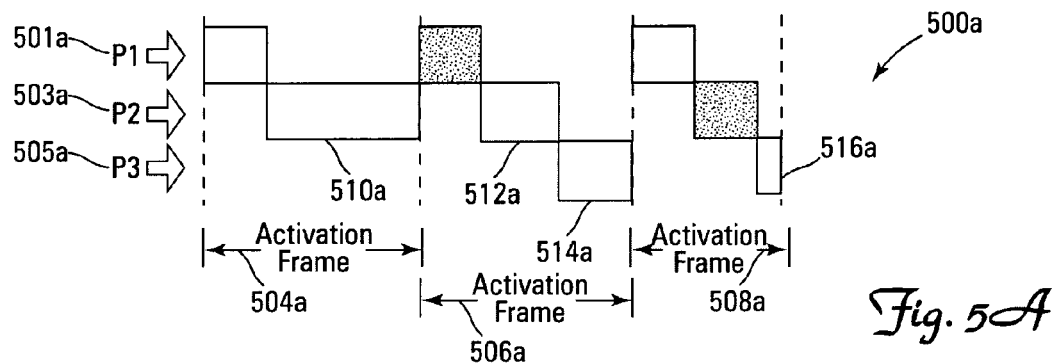
FIGS. 5A and 5B depict are related diagrams depicting how adjacent partition slices can be merged in accordance with the method shown in and described with respect to FIG. 4B.
Figure 5B:
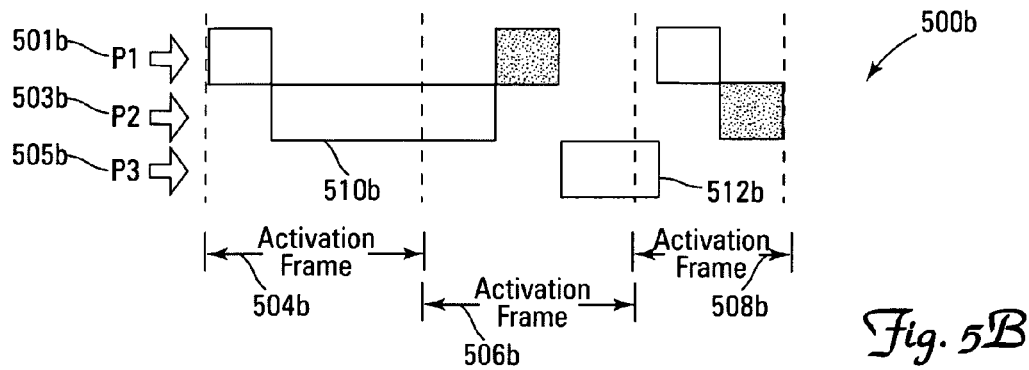

FIGS. 5A and 5B are related diagrams depicting how adjacent partition slices can be merged in accordance with method 400 shown in and described above with respect to FIG. 4B. Note that, for this example embodiment, operating system 500a in FIG. 5A includes three partitions 501a, 503a, 505a to be allocated, and a Timeline Period that includes three Activation Frames 504a, 506a, 508a. Also note that partition 503a in operating system 500a includes a slice 510a in Activation Frame 504a, and a second slice 512a in the next Activation Frame 506a. Similarly, partition 505a includes a slice 514a in Activation Frame 506a, and a second slice 516a in the next Activation Frame 508a.

Referring now to FIG. 5B, which illustrates the results of merging adjacent partition slices in FIG. 5A in accordance with method 400 and teachings of the present invention. For example, the partitioning operating system 500b (e.g., partitioning operating system 500a after slice merging has been performed) includes three partitions 501b, 503b, 505b, and a Timeline Period that includes three Activation Frames 504b, 506b, 508b. Note that partition 503b now includes a single slice 510b in adjacent Activation Frames 504b, 506b, which was formed by merging adjacent slices 510a, 512a in FIG. 5A. Also, note that partition 505b now includes a single slice 512b in adjacent Activation Frames 506b, 508b, which was formed by merging adjacent slices 514a, 516a in FIG. 5A.

It is important to note that while the present invention has been described in the context of a fully functioning system and method for generating a static partition scheduling timeline, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular system and method for generating a static partition scheduling timeline.

The description of the present invention has been presented for purposes of illustration and description, and is not intended to be exhaustive or limited to the invention in the form disclosed. Many modifications and variations will be apparent to those of ordinary skill in the art. These embodiments were chosen and described in order to best explain the principles of the invention, the practical application, and to enable others of ordinary skill in the art to understand the invention for various embodiments with various modifications as are suited to the particular use contemplated.

What is claimed is:

1. A method for generating a static partition scheduling timeline, comprising the steps of:
   identifying a plurality of partitions for scheduling, the partitions associated with an operating system that executes on a processing unit, wherein each of the plurality of partitions is associated with respective application software that is executed during the respective partition and each of the plurality of partitions having a respective static allocation of memory and execution time;
   defining a plurality of Activation Frames for said plurality of partitions, each of the plurality of Activation Frames comprising a respective continuous period of time during which no period associated with any of the plurality of partitions starts or ends, wherein defining the plurality of Activation Frames comprises:
      finding the least common multiple of a plurality of periods associated with said plurality of partitions;
      determining an Activation Time for each partition of said plurality of partitions;
      sorting said Activation Time for said each partition; and
      generating a list of said sorted Activation Times;
   defining a first plurality of slices within at least one Activation Frame of said plurality of Activation Frames;
   defining a second plurality of slices within at least one Activation Frame of said plurality of Activation Frames;
   identifying a plurality of slices for merging in two adjacent Activation Frames; and
   forming a combined slice, said combined slice including said plurality of slices for merging, wherein the static partition scheduling timeline comprises the plurality of Activation Frames, the first plurality of slices, and the second plurality of slices; and
   configuring the operating system to use the generated static partition scheduling timeline.

2. The method of claim 1, wherein the steps of defining said at least a first slice and said at least a second slice comprise:
   filling said first plurality of Activation Frames and said second plurality of Activation Frames with a plurality of slices in accordance with a Preemptive Earliest Deadline First schedule.

3. The method of claim 1, wherein the steps of defining said at least a first slice and said at least a second slice comprise:
   filling said first plurality of Activation Frames and said second plurality of Activation Frames with a plurality of slices in accordance with a Rate Monotonic schedule.

4. The method of claim 1, wherein the steps of defining said first plurality of slices and said second plurality of slices comprise:
   activating any partition of said plurality of partitions, if a period of said any partition coincides with a starting point of an Activation Frame;
   sorting all activated partitions to form a list of sorted active partitions; and
   creating a partition slice for each sorted active partition.

5. The method of claim 1, wherein the step of identifying a plurality of slices for merging in two adjacent Activation Frames comprises:
   determining if a slice associated with a first Activation Frame of said two adjacent Activation Frames and a slice associated with a second Activation Frame of said two adjacent Activation Frames are allocated to a single partition and occur during a single period associated with said single partition; and
   if so, merging said slice associated with said first Activation Frame with said slice associated with said second Activation Frame.

6. The method of claim 1, wherein the step of forming a combined slice comprises:
   moving a slice associated with a first Activation Frame to an end point of said first Activation Frame; and
   moving a slice associated with a second Activation Frame to a beginning point of said second Activation Frame.

7. The method of claim 1, wherein the static partition scheduling timeline comprises a scheduling timeline for an ARINC-653 operating system.

8. The method of claim 1, wherein the steps are executed by an APEX interface and a processing unit associated with an avionics system.

9. A system for generating a static partition scheduling timeline, comprising:
   a processing unit;
   an operating system coupled to said processing unit;
   an interface subsystem coupled to said operating system; and
   a plurality of partitions coupled to said interface subsystem, said processing unit operable to:
      identify said plurality of partitions for scheduling, wherein each of the plurality of partitions is associated with respective application software that is executed during the respective partition and each of the plurality of partitions having a respective static allocation of memory and execution time;
      define a plurality of Activation Frames for said plurality of partitions, each of the plurality of Activation Frames comprising a respective continuous period of time during which no period associated with any of the plurality of partitions starts or ends;
      define a first plurality of slices within at least one Activation Frame of said plurality of Activation Frames;
      define a second plurality of slices within at least one Activation Frame of said plurality of Activation Frames;
      identify a plurality of slices for merging in two adjacent Activation Frames; and
      form a combined slice, said combined slice including said plurality of slices, wherein the static partition scheduling timeline comprises the plurality of Activation Frames, the first plurality of slices, and the second plurality of slices and wherein the operating system uses the static partition scheduling timeline; and
   wherein the processing unit is operable to define said first plurality of slices and said second plurality of slices by doing the following:
      activating any partition of said plurality of partitions, if a period of said any partition coincides with a starting point of an Activation Frame;
      sorting all activated partitions to form a list of sorted active partitions; and
      creating a partition slice for each sorted active partition.

10. The system of claim 9, wherein said processing unit is further operable to:
   find the least common multiple of a plurality of periods associated with said plurality of partitions;
   determine an Activation Time for each partition of said plurality of partitions;
   sort said Activation Time for said each partition; and
   generate a list of said sorted Activation Times.

11. The system of claim 9, wherein said processing unit is further operable to:
   fill said plurality of Activation Frames with a plurality of slices in accordance with a Preemptive Earliest Deadline First schedule.

12. The system of claim 9, wherein said processing unit is further operable to:
   fill said plurality of Activation Frames with a plurality of slices in accordance with a Rate Monotonic schedule.

13. The system of claim 9, wherein said processing unit is further operable to:
   determine if a slice associated with a first Activation Frame of said two adjacent Activation Frames and a slice associated with a second Activation Frame of said two adjacent Activation Frames are allocated to a single partition and occur during a single period associated with said single partition; and
   if so, merge said slice associated with said first Activation Frame with said slice associated with said second Activation Frame.

14. A system for generating a static partition scheduling timeline, comprising:
   interface means;
   a plurality of partitions coupled to said interface means; and
   a processing unit, coupled to said interface means, wherein the processing unit is configured to identify said plurality of partitions for scheduling, wherein each of the plurality of partitions is associated with respective application software that is executed during the respective partition and each of the plurality of partitions having a respective static allocation of memory and execution time;
   wherein the processing unit is further configured to define a plurality of Activation Frames for said plurality of partitions, each of the plurality of Activation Frames comprising a respective continuous period of time during which no period associated with any of the plurality of partitions starts or ends, to define a first plurality of slices within at least one Activation Frame of said plurality of Activation Frames, to define a second plurality of slices within at least one Activation Frame of said plurality of Activation Frames, to identify a plurality of slices for merging in two adjacent Activation Frames, and to form a combined slice, said combined slice including said plurality of slices for merging, wherein the processing unit is configured to define the plurality of Activation Frames by doing the following:
      finding the least common multiple of a plurality of periods associated with said plurality of partitions;
      determining an Activation Time for each partition of said plurality of partitions;
      sorting said Activation Time for said each partition; and
      generating a list of said sorted Activation Times.

15. A computer program product, comprising:
   a computer storage having computer-readable code embodied therein for configuring a computer processor when executed, the computer program product comprising:
   a first executable computer-readable code configured to cause the computer processor to identify a plurality of partitions for scheduling, wherein each of the plurality of partitions is associated with respective application software that is executed during the respective partition and each of the plurality of partitions having a respective static allocation of memory and execution time;
   a second executable computer-readable code configured to cause the computer processor to define a plurality of Activation Frames for said plurality of partitions, each of the plurality of Activation Frames comprising a respective continuous period of time during which no period associated with any of the plurality of partitions starts or ends;

a third executable computer-readable code configured to cause the computer processor to define a first plurality of slices within at least one Activation Frame of said plurality of Activation Frames; and a fourth executable computer-readable code configured to cause the computer processor to define a second plurality of slices within at least one Activation Frame of said plurality of Activation Frames;

a fifth executable computer-readable code configured to cause the computer processor to identify a plurality of slices for merging in two adjacent Activation Frames; and a sixth executable computer-readable code configured to cause the computer processor to form a combined slice, said combined slice including said plurality of slices for merging, wherein the third and fourth executable computer-readable codes are configured to cause the computer processor to:

activate any partition of said plurality of partitions, if a period of said any partition coincides with a starting point of an Activation Frame;

sort all activated partitions to form a list of sorted active partitions; and create a partition slice for each sorted active partition.

* * * * *